United States Patent Office 3,402,681
Patented Sept. 24, 1968

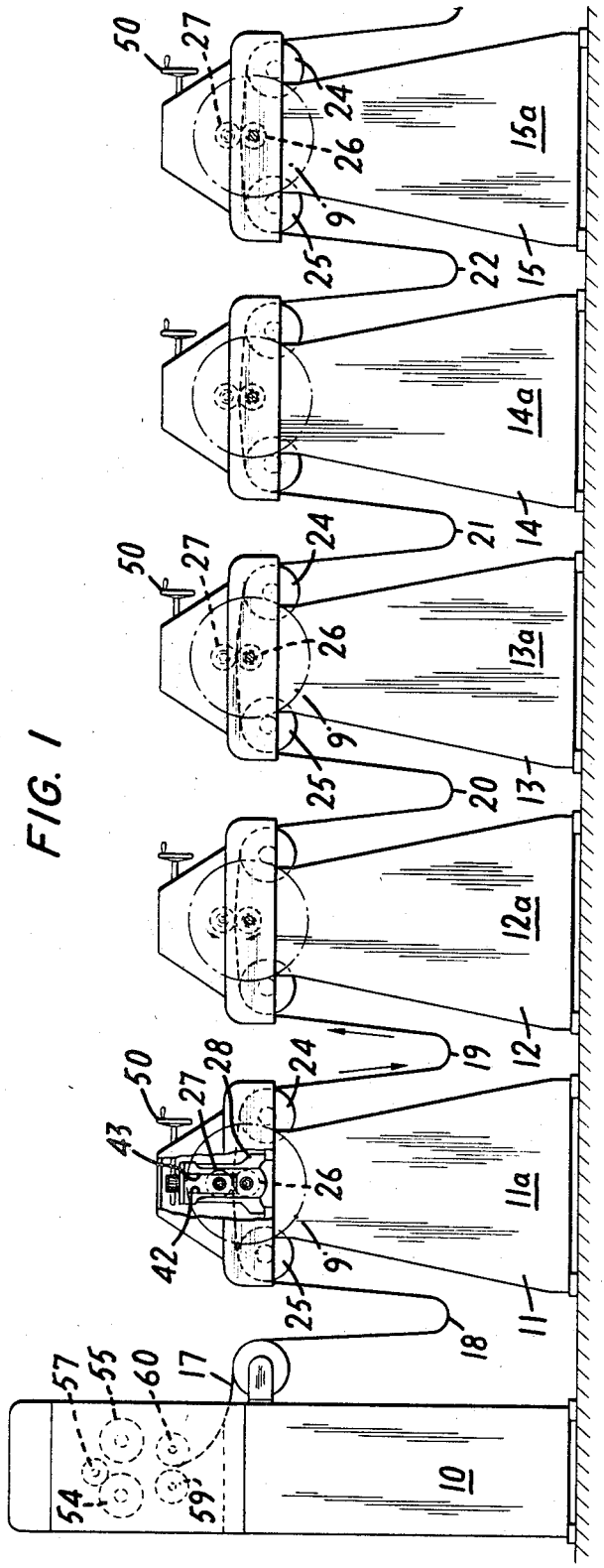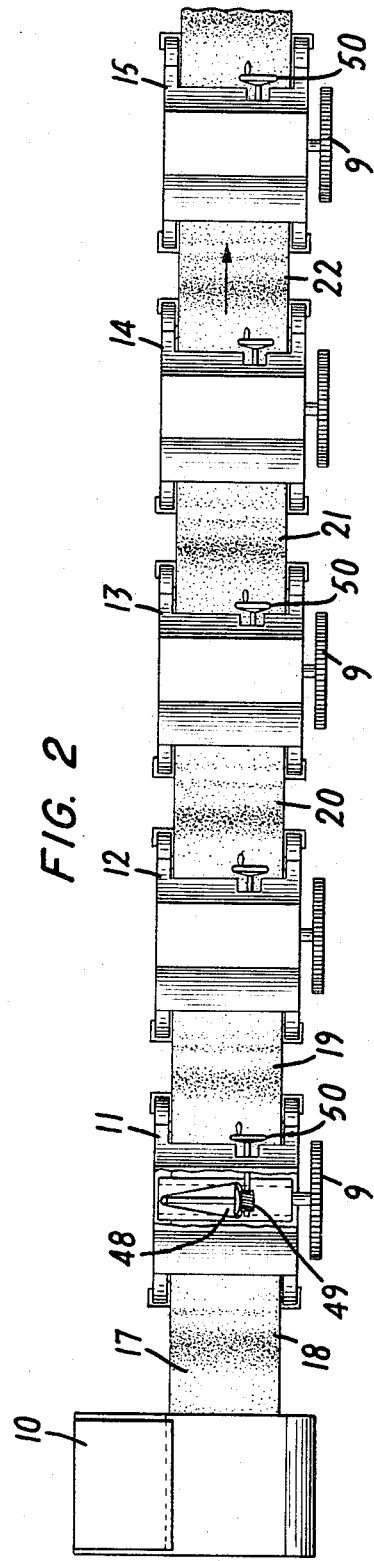

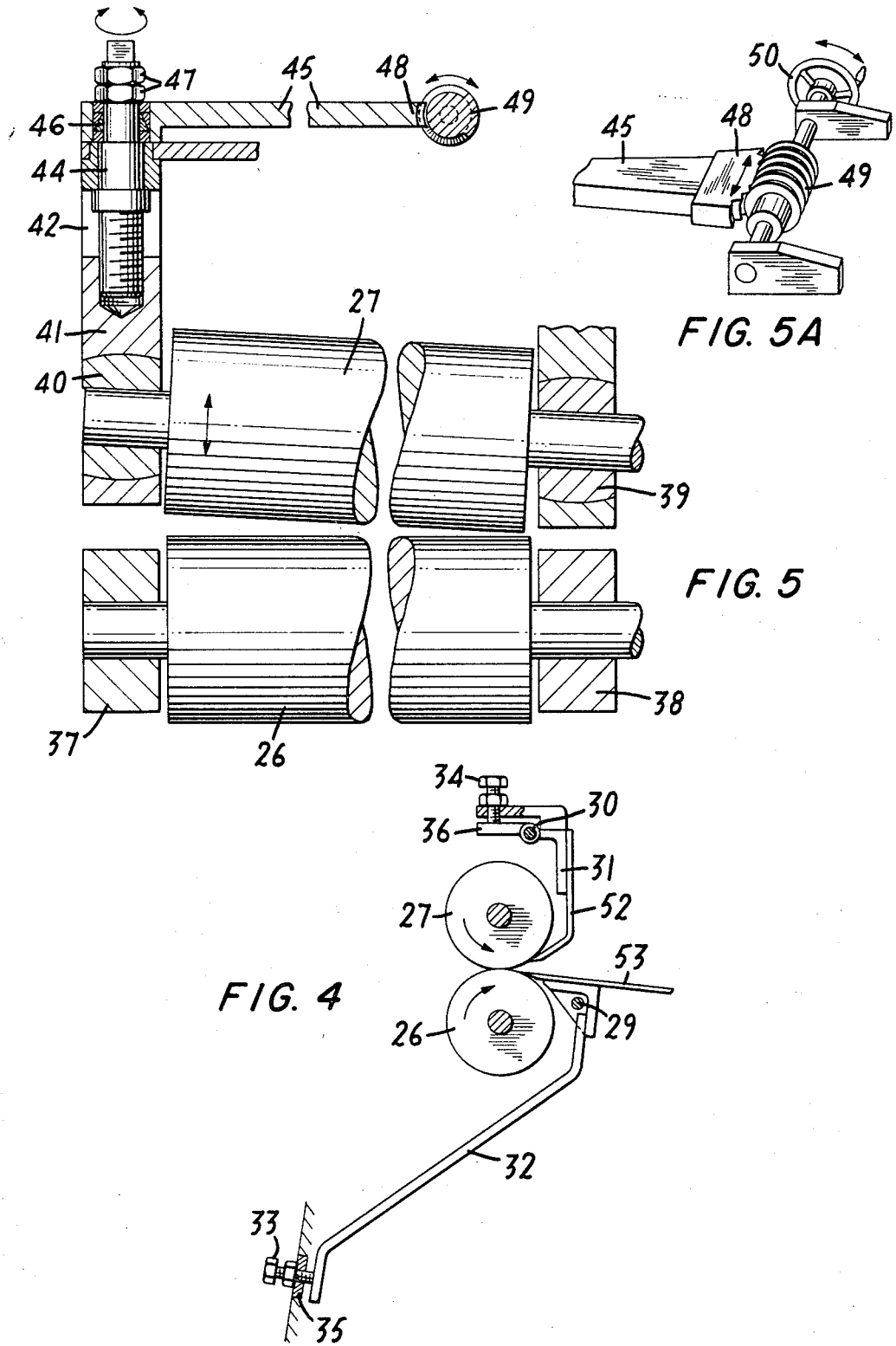

3,402,681
STRUDEL DOUGH PLANT
Edward Mandikian, Union City, N.J. (500 Hudson Ave., Weehawken, N.J. 07087), and Karl Loser, Isoldester, Germany; said Loser assignor to said Mandikian
Filed Apr. 7, 1966, Ser. No. 540,925
Claims priority, application Germany, Apr. 7, 1965, W 38,920
15 Claims. (Cl. 107—12)

ABSTRACT OF THE DISCLOSURE

In a process and apparatus for rolling dough into an extremely thin strip, the dough, in a preliminary stage is consecutively rolled, folded and rerolled by a roughing mill to produce a pre-formed strip of dough which is then passed successively through a plurality of roll nips of consecutively smaller clearance of a finishing mill. Between the roughing mill and the finishing mill and between successive roll nips of the finishing mill the dough strip is suspended downwards in a loop under the influence of its own weight.

---

The present invention relates to a process and an apparatus for the rolling of dough into extremely thin sheets, especially for the production of baked goods requiring very thin dough, such as strudel.

The preparation of certain dough products, such as strudel dough, requires extremely thin sheets of dough. The thickness of the sheets should not exceed 0.1 mm. Up to the time of the present invention, mechanical production of sheets of this thinness by rolling in rolling machines was not possible, since the strip of dough adheres to the rolls and tears if its thickness falls below a certain minimum. With the previously known rolling machines for dough products, such as noodles, the thickness of the strips cannot be reduced below 0.5 mm. Consequently, the production of strudel dough is carried out commercially in the same manner as in households, i.e., manually. The dough is rolled by hand and subsequently flung about by arms raised above the head. In this manner, the dough is stretched by centrifugal forces until the strip reaches the desired thickness. This work is troublesome and tedious and requires a high degree of skill. Consequently, the time required for the production of large quantities of dough sheets is extremely long.

The present invention is directed to a process and an apparatus for the rolling of dough into extremely thin sheets of dough. This renders possible the automatic production of extremely thin sheets of dough without any manual labor. According to the present invention, a preformed strip of dough, for example of 1.5 mm. thickness, is lead through the roll clearances of a plurality of rolling mills. These roll clearances are narrowed in the direction of the movement of the dough. In each space between a successive pair of the rolling mills, the strip of dough is advanced in the configuration of a loop which is suspended downwards due to the weight of the strip of dough. The dough in each of these loops is stretched slightly by the effect of its own weight; simultaneously, a superficial drying takes place on its surface. As a result, the moisture still present in the dough is in its interior and, therefore, the dough of the loop is not sticky during its passage through the next rolling mill. The strip of dough enters the roller clearance every time in a dry state and remains superficially dry during the short transit time through the rolls. Consequently, the strip of dough separates easily from the surfaces of the rolls, without adhering to the rolls and without tearing.

According to the invention, the above described preformed strips of dough are made in a roughing mill by rolling, repeated folding together and re-rolling. It is preferred that the preformed strip be fed directly from the roughing mill to the rolling mills and that the conveying speed of the roughing mill and the subsequent roll of the first rolling mill be adjusted so that a loop is also formed in the strip prior to its entry into the first rolling mill. The formation of a loop is particularly important at this point because the strip of dough is still rather thick at the beginning of the rolling operation and, accordingly, still has a considerable moisture content. The formation of this preliminary loop, like the subsequent loops causes stretching of the strip and drying of its surface.

Since the strip of dough is capable of absorbing only small tensile stresses, the loops are positioned so that the sections of the loops which are directed upwards and downwards, i.e., are upright, are as vertical as possible, i.e. approximately vertical, for example, at least about 70° or 80° from the horizontal.

However, if the upright sections of the dough strips would proceed directly from an approximately vertical orientation into the horizontal roll clearance of the rolling mill, the arc over which the dough strips would contact the first roller of the rolling mill would be too large and would eventually result in problems due to adherence of the dough on the surface of the roller. In order to eliminate this possibility, it is preferred to direct the dough strip prior to entry into the rolling mill into an approximately horizontal orientation; upon leaving the rolling mill the strip is again allowed to assume an approximately vertical orientation.

In order to carry out the process, according to the present invention, there may be used an apparatus in which a rolling mill consisting of several serially arranged and spaced single rolling mills the first of which is spaced from and aligned with the direction of flow from the outlet of a roughing mill which supplies the preformed dough strip. Each of the single rolling mills consists of a pair of rolls which are superimposed in a vertical plane and the axes of which are in the same vertical plane, and which can be driven in mutually opposite directions of rotation. Each of the single rolling mills is equipped with a conventional drive means or motor installation, which can be adjusted independently, for the speed regulation of the rolls.

In a preferred construction, the drive means and/or the rolls of the pair of rolls are constructed in such a manner that the upper roll of the pair of rolls of the single rolling mill can always be driven at a somewhat higher peripheral speed than the lower roll. This can be accomplished, for example, in the simplest manner by providing an upper roll of a slightly larger diameter than the lower roll.

This differential between the peripheral speeds of the upper and lower rolls effectively further reduces any tendency of the dough strip to adhere to the rolls. If the dough strip has a tendency to adhere to the surface of the upper roll, even a slight differential, which for example can be attained if the upper roll, operated at the same number of revolutions per unit time as the lower roll, has a diameter which is 2% greater, is sufficient to effect a separation of the dough sheet even at a considerable conveying speed.

In order to attain sensitive means for regulating the peripheral speeds of the single rolling mills, it is preferred that the motor of each be equipped with gears which can be adjusted continuously without steps.

A further feature of apparatus according to the present invention is the provision of a skimmer for every roll of the single rolling mills. These skimmers must be fitted with great precision to engage the surface of the rolls and, accordingly, are provided with means for precision adjustment. Each of the precision adjustment means comprises a two-armed lever which is mounted to rotate in a radial plane of the accompanying roll, one arm of which lever is shorter than the other and to which shorter arm the skimmer is attached. For each lever there is provided an adjustable stop which limits its rotating motion. The stop engages the end of the longer arm of the lever. The arc of rotation of the skimmer is reduced relative to the arc of rotation of the stop in proportion to the lengths of the two lever arms. This renders possible a precision adjustment of the skimmer. It is preferred that the skimmer consist of a softer material than the roll to avoid scarring of the roll; the skimmer should be adjusted to abut against the roll with only slight pressure.

The adjustment of the roll clearance to an identical width over the total axial length of each pair of rolls is of great importance for the proper operation of the equipment. The surfaces of the rolls should run parallel with a precision of plus or minus 0.01 mm. in the roll clearance. In the event of divergence of the roll clearance, the dough strip pushes toward the side of the greater clearance. This increases the possibility of tearing and may also result in other difficulties. In order to counter this problem, a further feature of apparatus according to the present invention provides means for adjustment of the parallelism of the roll clearance of each single rolling mill. This adjustment means comprises means for adjusting the angular position of the upper roll of the pair of rolls in the vertical plane, relative to the position of the lower roll. For this purpose, the bearing supporting the upper roll on one side is stationary. However, this bearing is rotatable in the vertical axial plane of the rolls. The bearing supporting the upper roll on the other side also is rotatable in the vertical axial plane of the rolls and, further, its elevation can be adjusted, i.e., it is vertically displaceable, so that the upper roll is rotatable, in that axial plane, around the stationary bearing.

It has generally been found necessary to readjust or correct the adjustment of the single rolling mills, which had been made prior to putting the machine into operation, because the original adjustment is effected by operation of the machine. These readjustments have to be made while the machine is in operation. According to still a further feature of the present invention there is provided setting means, which can be locked, for the adjustment of the angular position of the upper roll. The setting means comprises fine or precision adjustment means and coarse adjustment means. The fine adjustment means comprises a self-locking rack-and-pinion drive which is adjustable by means of a hand wheel during the operation of the machine, i.e., it acts as a worm gear drive. The coarse adjustment means, which is set prior to putting the machine into operation, and which provides for the same or for a greater range of adjustment than the fine adjustment means, can be constructed in any manner desired. The fine adjustment means permits the continuous readjustment of the parallelism of the roll clearance, depending on the behavior of the dough strip passing through the machine.

As mentioned above, it is preferred to direct the dough strip into the horizontal direction prior to entry into each rolling mill, and into the vertical direction upon leaving the rolling mill. This limits the contact of the dough strip with the lower roll of the rolling mill to the smallest arc possible. One might think that this could be accomplished, for example, by a feeding table and a receiving table placed at opposite sides of the roll clearance, these tables having edges which are rounded off toward the bottom. However, it is found that an arrangement of this type is not satisfactory since the breaking strength of a dough strip, which has been rolled to a fraction of a millimeter, cannot absorb the stress caused by friction during the pulling of the strip over the rounded edge of the table. This problem is solved, according to the present invention, by providing a guide roller at each side of each rolling mill, the axes of which guide rollers are parallel to the axis of the lower roll. These guide rollers can be arranged so as to rotate freely; the strip should be subject to a minimum of friction. Under critical conditions regarding the breaking strength of the dough strip, which occur particularly during the last rolling stages, the guide rollers are driven in order to reduce the tension of the dough strip. Since the feeding speed is increased in every single rolling mill due to the stretching of the dough strip in the roll clearance, the number of revolutions or the peripheral speed of the guide roller on the delivery side should always be higher than that of the guide roller on the feeding side of the same single rolling mill.

A particular embodiment of the apparatus for carrying out the process, according to the present invention, is shown schematically in the drawings, wherein:

FIG. 1 is a side view of the apparatus;

FIG. 2 is a top plan view of the same apparatus;

FIG. 4 is a side view of the skimmers and the arrangement for adjustment of the skimmers of the apparatus of FIGS. 1 and 2;

FIG. 5 is a front view, partly in section, of the top and bottom rolls of a rolling mill and of the means for adjusting the parallelism of the roll clearance of the apparatus of FIGS. 1 and 2;

FIG. 5A is a top perspective of the fine adjustment means of the adjusting means of FIG. 5.

Figure 3:
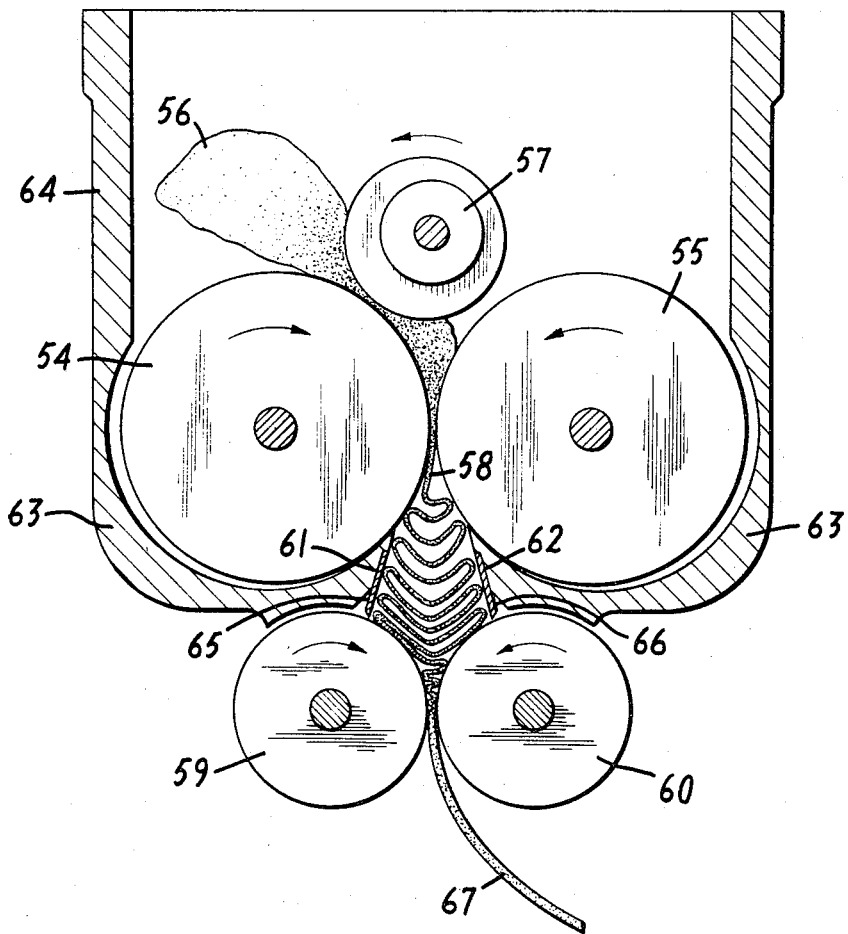
FIG. 3 is a side view, partly in section, of the roughing mill of the apparatus of FIGS. 1 and 2.

To the roughing mill 10 (FIG. 1), the dough working portion of which is shown in detail in FIG. 3, is fed a mass 56 of dough. Roughing mill 10 includes an eccentrically mounted feed roll 57, a pair of large driven rolls 54 and 55 and a pair of small driven rolls 59 and 60. The upper part of a housing in which the rolls are disposed constitutes a hopper 64 and the lower part 63 of the housing has interior walls which are curved to conform to the curvature of rolls 54 and 55. On surfaces 61 and 62 respectively of the lower part 63 of the housing are mounted guide plates 65 and 66 respectively. The direction of rotation of each of the various rolls is indicated by an arrow. The eccentric mounting of roll 57 causes the mass 56 of dough to be shaped to substantially fill the nip of rolls 54 and 55 after being flattened in the nip of rolls 54 and 57. In the upper nip of rolls 54 and 55 the mass 56 of dough is flattened into a very thin strip 58, e.g., 0.5 mm. The strip 58 is allowed to repeatedly fold upon itself in the V-shaped passage defined by the lower nip of rolls 54 and 55 in conjunction with the guide plates 65 and 66. This folding may be accomplished, for example, by operating rolls 54 and 55 at a higher peripheral speed than rolls 59 and 60 when first starting the operation. In the nip of rolls 59 and 60 the folded strip 58 is laterally compressed to form a thicker, e.g., 1.5 mm., strip 67.

From the roughing mill 10, the dough strip 67 passes through the single rolling mills 11, 12, 13, 14 and 15 of the finishing rolling mill, which single rolling mills are arranged in series with the roughing mill 10. Each of the single rolling mills is mounted on a high foundation 11a to 15a. The dough strip 67 is passed in freely suspended loops 18, 19, 20, 21 and 22 between the roughing mill 10 and the first single rolling mill 11 and also between the successive single rolling mills 12 to 15. After passing through the last single rolling mill 15, the dough strip may be subjected to further baked goods making operations. The loops 18 to 22 are directed in such a manner that their ascending and descending sections are in an approximately vertical orientation. The single rolling mills consist primarily of pairs of rolls consisting of a lower roll 26 and an upper roll 27, which are arranged vertically on top of one another with their axes in the same vertical plane. They are both supported by a frame 28, of which only one side is visible (FIG. 1). The roller frame 28 supports roller bearings 37, 38, 39 and 40 and forms a part of a housing which holds the driving parts of each single rolling mill. The gear wheel 9 (FIG. 2) transmits the rotary motion of a conventional common drive (not shown in the illustration) through a conventional gear transmission which is adjustable without stages (not shown in the illustration) to the single rolling mill. The single rolling mill 11, as well as the single rolling mills 12 to 15 which are exactly like the single rolling mill 11, are each provided with guide rollers 24 and 25 which are mounted at opposite sides of the rolls 26 and 27. The guide rollers 24 and 25 direct the dough strip into a horizontal direction at the feeding side of the single rolling mill, and into a vertical direction at the discharge side of the single rolling mill. The guide rollers 24 and 25 are also connected to the gear transmission by adjustment of which the driving speed of the rolls 26 and 27 is adjusted so that their peripheral speed corresponds to the feeding speed of the dough strip section being fed thereto.

The rolls 26, 27 are provided with skimmers 52, 53 (FIG. 4) which extend along the axial length of the rollers 26 and 27 and the edges of which are fitted against the rolls 26 and 27 respectively. The skimmer 53 for the lower roll 26 is mounted on a support bracket and extends away from the rolls 26 and 27; this extension constitutes a support plate for the dough strip. The dough strip slides over this support plate to the guide roller 24 (FIG. 1). The working part of the skimmers 52 and 53 constitutes the tapered end of the shorter arm of respective two-armed levers one arm of which is shorter than the other and which can be rotated around the respective bearing points 29 and 30. The long arms 31 and 32 of the levers rest with their ends, which are turned away from the bearing points, on setscrews which act as adjustable stops 33 and 34. The setscrews are screwed into the stationary stop faces 35 and 36. If, for example, the adjustable stop 33 of the skimmer of the lower roll 26 is turned by a certain amount towards the end of the lever arm 31, so that the distance between the end of the lever arm and the stop face is increased, then the skimmer 53 turns only by a fraction of this distance in approximately radial direction towards the lower roll 26. The reason is that the lengths of the arcs, in which the end of the section of the lever arm 31, which extends from the turning point to the setscrew 33, and the edge of the skimmer 53 move in opposite directions are proportional to their radial distances from the bearing point 29. The same applies with respect to the upper skimmer 52.

The lower roll 26 (FIG. 5) is supported by the stationary bearings 37 and 38. The upper roll 27 is supported by conventional self-aligning bearings 39, 40 which bearings are provided with bearing boxes which have a spherically shaped external circumference. The bearing 40 is supported by a sliding contact 41 which has an internal thread. The sliding contact 41 is guided between the faces 42, 43 of the roller frame 28. The sliding contact 41 has a pivot 44 with a square head and an external thread, which pivot extends through an opening in a lever 45 and is secured to the lever 45 by nuts 47. The upper roll 27 is shown in an exaggerated angular position (FIG. 5) in order to illustrate the nature of the adjustment of the roll clearance. In order to adjust the parallelism of the roll clearance, i.e., of the axial peripheries of the rolls 26 and 27 which define the nip therebetween, the nuts 47 are loosened prior to putting the apparatus into operation, and the pivot 44 is correspondingly turned with a key which is placed onto the square head of the pivot 44. Subsequently, the clearance is checked with a feeler gauge. If a divergence of the boundary lines of the roll clearance exists, i.e. an angularity of the upper roll, then the upper roll has to be lowered or raised on the left side. The pivot 44 is turned by the amount required; then the nuts 47 are again tightened to lock the pivot to lever 45. This finishes the coarse adjustment which is required to put the rolling mill into operation.

The lever 45, which can be roated around the axis of the pivot 44, has a worm gear segment 48 which mates with a screw 49, which screw can be rotated by a hand wheel 50 (FIG. 5A). If a condition arises during the operation, whereby the dough strip discharges towards one side, a readjustment is required. In that case, a turning of the hand wheel 50 will result in a turning of the lever 45 and hence the pivot 44 either clockwise or counter-clockwise. Hereby, the sliding contact 41 is shifted either upwards or downwards, effecting a fine adjustment of the parallelism of the roll clearance. An exact axial guidance of the dough strip, and thereby a uniform thickness of the dough strip over its entire width, can thus be obtained by this precise readjustment.

In operation, the roll clearances of the serially arranged rolling mills are set consecutively narrower in order gradually, in stages, to reduce the thickness of the dough strip from an initial thickness of, for example, 1.5 mm., to a final thickness of, for example, 0.5 mm. During start-up, either the speed of each rolling mill is adjusted to overfeed to the subsequent rolling mill and the speed of the roughing mill is adjusted to overfeed to the first rolling mill, or a length of dough strip is permitted to accumulate after the roughing mill before the dough strip is fed into the first rolling mill and, similarly, a length of dough strip is permitted to accumulate after each rolling mill before being fed into the subsequent one, in order to form the loops. During steady-state operation, since the dough strip is lengthened by the flattening in each rolling mill and by the stretching in each loop, consecutive rolling mills are operated at progressively higher speeds and the first rolling mill is operated at a higher speed than the output speed of the roughing mill. The term "speed" refers to the linear speed of the dough strip, which corresponds to the peripheral speed of the driven roll pair at the stage under consideration.

The invention is not to be construed as limited to the particular forms disclosed herein, since these are to be regarded as illustrative rather than restrictive.

What we claim and desire to secure by Letters Patent is:

1. A process for rolling dough into an extremely thin strip comprising a preliminary stage of consecutively rolling, folding, and re-rolling a mass of dough, thereby to produce a pre-formed strip of dough, and a finishing stage of passing said pre-formed strip of dough through and compressing it in a plurality of roll nips of consecutively narrower clearance and suspending the strip of dough downwards in a loop under the influence of its own weight between the preliminary stage and the first of the roll nips and between consecutive pairs of the roll nips.

2. A process according to claim 1, further comprising directing the strip of dough into an approximately horizontal orientation immediately prior to feeding the strip into each roll nip and directing the strip into a vertical orientation after the strip leaves the roll nip.

3. An apparatus for rolling dough into an extremely thin strip comprising a roughing mill for consecutively rolling, folding, and re-rolling a mass of dough to produce a pre-formed strip of dough, and a finishing mill spaced from and aligned with said roughing mill, said finishing mill consisting essentially of a plurality of rolling mills spaced from and aligned with said roughing mill and mutually spaced and aligned and each rolling mill comprising a paired approximately axially parallel upper and lower roll having therebetween an approximately parallel clearance defining a nip for passage therethrough of said strip, and means coordinating said roughing mill and finishing mill and coordinating said rolling mills with one another to suspend the strip of dough downwards in a loop under the influence of its own weight between said roughing mill and said finishing mill and between successive rolling mills of said finishing mill.

4. An apparatus according to claim 3, further comprising means for imparting a peripheral speed to the upper roll of each rolling mill higher than a peripheral speed imparted to the lower roll of the same rolling mill.

5. An apparatus according to claim 4, wherein said means comprises providing the upper roll with a larger diameter than the lower roll.

6. An apparatus according to claim 3, further comprising for each rolling mill a roller disposed upstream of the nip of the paired rolls for guiding the strip approximately horizontally to the nip and a roller disposed downstream of said nip for guiding the strip approximately vertically into a first section of the suspended loop to be formed by the strip.

7. An apparatus according to claim 3, further comprising for each rolling mill a gear transmission for driving the paired rolls thereof from a common drive means, said gear transmission being continuously adjustable without steps.

8. An apparatus according to claim 7, further comprising for each roll of the paired rolls of each rolling mill a skimmer abutting against the curved periphery of the roll.

9. An apparatus according to claim 8, in which each skimmer constitutes the free end of the shorter arm of a two-armed lever having arms for unequal length, said lever being mounted on a pivot for rotation in the radial plane of the corresponding roll.

10. An apparatus according to claim 3, wherein each rolling mill is provided with means for adjusting the parallelism of the clearance between the paired rolls.

11. An apparatus according to claim 10, wherein said means for adjusting comprises means for adjusting in a vertical plane the orientation of the axis of the upper roll of the paired rolls relative to a fixed horizontal orientation of the corresponding lower roll.

12. An apparatus according to claim 11, further comprising a self-adjusting bearing stationarily mounted and supporting one axial end of the upper roll and a self-adjusting bearing vertically displaceably mounted and supporting the other axial end of the upper roll, said self-adjusting bearings being rotatable in the vertical plane in which the axis of the upper roll lies.

13. An apparatus according to claim 11, wherein said means for adjusting comprises means for coarse adjustment and means for fine adjustment.

14. An apparatus according to claim 13, further including a frame for supporting said paired rolls, said frame having a vertical slot in which a member is slidingly mounted, said member mounting at its lower end said vertically displaceably mounted bearing and constituting a vertically displaceable mounting for said bearing, a threaded pivot, a threaded vertical bore in said frame disposed above and communicating with said slot, said pivot being positioned in said bore with the upper end of the pivot extending therefrom and with the thread of the pivot engaging the thread of the bore, said pivot being rotatable by means of a key by which said coarse adjustment is effected.

15. An apparatus according to claim 14, further including a lever operatively connected at one of its ends to the upper end of the pivot and the other of its ends having engaging means, a second engaging means engaging said engaging means of said lever, whereby operating of said second engaging means rotates the lever and, accordingly, rotates the pivot to effectuate said fine adjustment.

References Cited

UNITED STATES PATENTS

| | | | |
|---|---|---|---|
| 777,349 | 12/1904 | Mitchell | 107—12 |
| 904,231 | 11/1908 | Schou | 118 |
| 2,228,394 | 1/1941 | Marvin et al. | 68—269 |
| 2,861,504 | 11/1958 | Kane | 100—46 |
| 2,965,050 | 12/1960 | Doering | 107—12 |
| 3,327,652 | 6/1967 | Seewer | 107—12 |

WALTER A. SCHEEL, *Primary Examiner.*

A. O. HENDERSON, *Assistant Examiner.*